(12) United States Patent
Carpenter

(10) Patent No.: US 9,045,289 B2
(45) Date of Patent: Jun. 2, 2015

(54) UNIVERSAL SAFETY DEVICE FOR EXTENDIBLE CONVEYORS

(71) Applicant: Siemens Industry, Inc., Alpharetta, GA (US)

(72) Inventor: Michael D. Carpenter, Arlington, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 14/458,395

(22) Filed: Aug. 13, 2014

(65) Prior Publication Data

US 2014/0346013 A1 Nov. 27, 2014

Related U.S. Application Data

(63) Continuation-in-part of application No. 14/268,023, filed on May 2, 2014.

(60) Provisional application No. 61/819,015, filed on May 3, 2013, provisional application No. 62/004,354, filed on May 29, 2014.

(51) Int. Cl.

| B65G 15/26 | (2006.01) |
|---|---|
| G06F 19/00 | (2011.01) |
| B65G 43/02 | (2006.01) |
| B65G 43/00 | (2006.01) |
| B65G 67/08 | (2006.01) |
| B65G 67/20 | (2006.01) |
| B65G 21/14 | (2006.01) |

(52) U.S. Cl.
CPC .............. *B65G 43/02* (2013.01); *B65G 21/14* (2013.01); *B65G 43/00* (2013.01); *B65G 67/08* (2013.01); *B65G 67/20* (2013.01)

(58) Field of Classification Search
USPC ............. 198/587, 588, 589, 617, 810.01, 198/810.03, 812; 414/398; 340/676; 348/150; 700/62, 65, 230; 701/2, 50
See application file for complete search history.

(56) References Cited

U.S. PATENT DOCUMENTS

| 4,146,924 | A | * | 3/1979 | Birk et al. | 700/259 |
|---|---|---|---|---|---|
| 5,391,038 | A | * | 2/1995 | Stewart | 414/392 |
| 5,403,142 | A | * | 4/1995 | Stewart | 414/392 |
| 5,642,803 | A | * | 7/1997 | Tanaka | 198/535 |
| 5,685,416 | A | * | 11/1997 | Bonnet | 198/812 |
| 5,697,753 | A | * | 12/1997 | Aurora et al. | 414/398 |
| 6,006,893 | A | * | 12/1999 | Gilmore et al. | 198/588 |
| 6,097,425 | A | * | 8/2000 | Behnke et al. | 348/89 |
| 6,272,924 | B1 | * | 8/2001 | Jansen | 73/379.01 |
| 6,470,240 | B1 | * | 10/2002 | Haynes et al. | 701/1 |
| 7,034,666 | B2 | * | 4/2006 | Knutson | 340/431 |
| 7,098,891 | B1 | * | 8/2006 | Pryor | 345/158 |
| 7,108,125 | B2 | * | 9/2006 | Gilmore et al. | 198/812 |
| 7,404,556 | B2 | * | 7/2008 | Allen et al. | 271/201 |
| 7,768,549 | B2 | * | 8/2010 | Cofer | 348/152 |

(Continued)

*Primary Examiner* — Douglas Hess

(57) ABSTRACT

An extendable boom conveyor system having a first boom element, a controller, and a movement sensor. The controller, using the movement sensor, can detect cyclic movement of a distal end of the first boom element and, in response to the detection, move the first boom element to reduce the cyclic movement. A method performed by an extendible conveyor system can include detecting movement of a distal end of a first boom element, determining whether there is a cyclic movement of the distal end in one or more axes, and moving the first boom element when there is a cyclic movement of the distal end.

20 Claims, 4 Drawing Sheets

(56) References Cited

U.S. PATENT DOCUMENTS

| | | | |
|---|---|---|---|
| 7,983,821 B2 * | 7/2011 | Reeves | 701/50 |
| 8,186,497 B2 * | 5/2012 | Mackin et al. | 198/312 |
| 8,205,741 B2 * | 6/2012 | Swinderman et al. | 198/499 |
| 8,381,900 B1 * | 2/2013 | Hoogestraat | 198/588 |
| 8,397,901 B2 * | 3/2013 | Brouwer et al. | 198/588 |
| 8,561,805 B2 * | 10/2013 | Scott et al. | 209/555 |
| 8,622,199 B2 * | 1/2014 | Windfeld et al. | 198/588 |
| 8,662,291 B2 * | 3/2014 | Henderson | 198/812 |
| 8,714,334 B2 * | 5/2014 | Yang et al. | 193/35 TE |
| 8,944,239 B2 * | 2/2015 | Campbell et al. | 198/588 |

* cited by examiner

UNIVERSAL SAFETY DEVICE FOR EXTENDIBLE CONVEYORS

CROSS-REFERENCE TO RELATED APPLICATION

This application is a continuation-in-part of U.S. patent application Ser. No. 14/268,023, filed May 2, 2014, hereby incorporated by reference; this application and the parent application claim the benefit of the filing date of U.S. Provisional Patent Application 61/819,015, filed May 3, 2013, which is hereby incorporated by reference. This application also claims the benefit of the filing date of U.S. Provisional Patent Application 62/004,354, filed May 29, 2014, which is hereby incorporated by reference.

TECHNICAL FIELD

The present disclosure is directed, in general, to systems and methods for use with extendible conveyors.

BACKGROUND OF THE DISCLOSURE

Improved, safer, and more efficient systems for unloading parcels and other items from a container or trailer are desirable.

SUMMARY OF THE DISCLOSURE

Various disclosed embodiments include an extendable boom conveyor system and method. In one embodiment, an extendable boom includes first and second boom elements, each with a drive mechanism and a control system. The boom elements can detect and respond to unsafe conditions.

Various embodiments include an extendable boom conveyor system having a first boom element, a controller, and a movement sensor. The controller, using the movement sensor, can detect cyclic movement of a distal end of the first boom element and, in response to the detection, move the first boom element to reduce the cyclic movement.

Various embodiments include a method performed by an extendible conveyor system. The method can include detecting movement of a distal end of a first boom element, determining whether there is a cyclic movement of the distal end in one or more axes, and moving the first boom element when there is a cyclic movement of the distal end.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
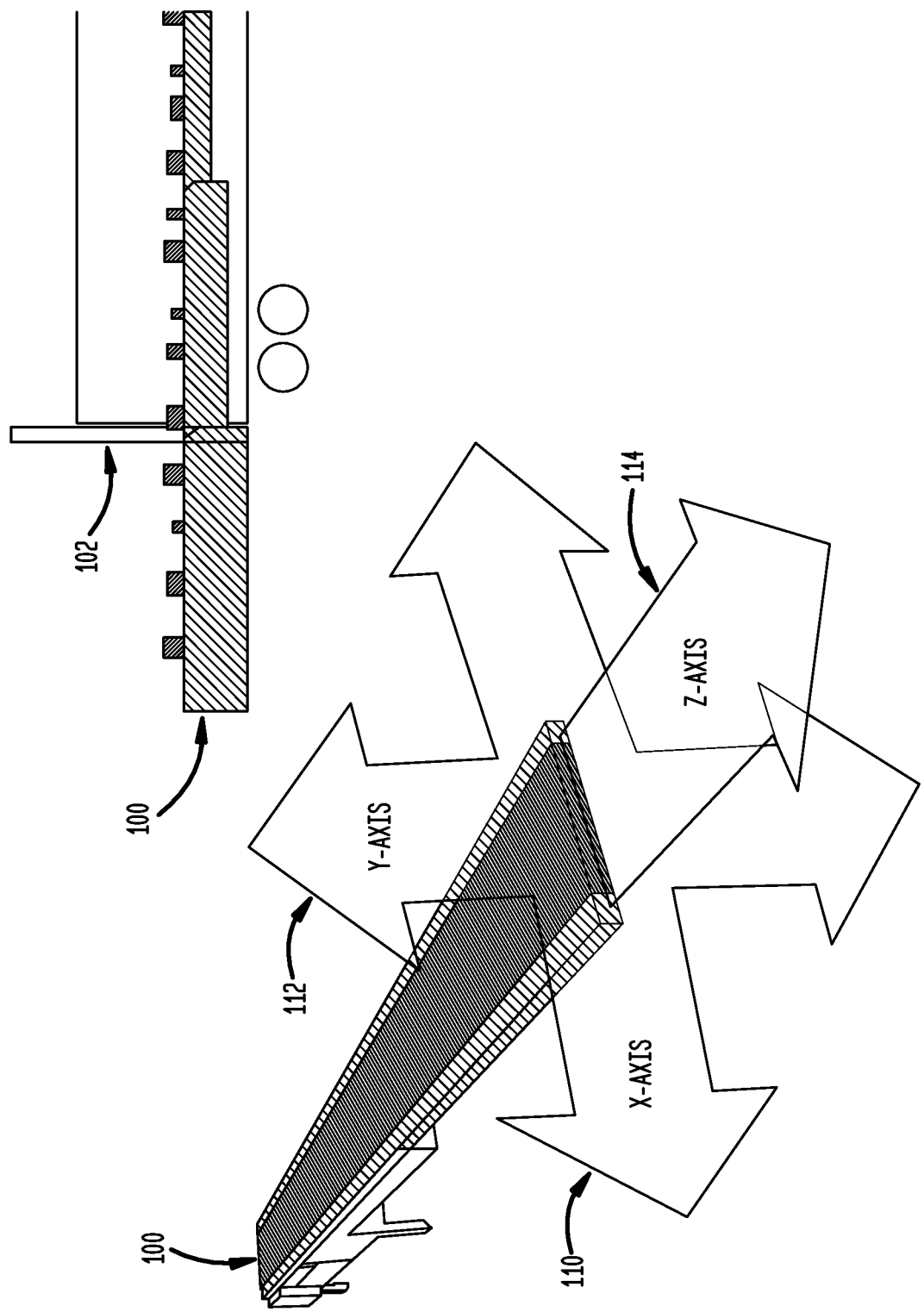
FIG. 1 illustrates an extendible conveyor in two views to show the axes of movement of the conveyor.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Extendable loaders are often implemented at loading docks for trucks, trailers or the like. Some extendable loaders (referred to as "gravity loaders") are extendable into a truck/trailer or other container and angled downward such that gravitational forces cause packages to move down the loaders along a plurality of rollers. Other extendable loaders include a powered conveyor belt or other transport mechanism, which may be used to move packages into or out of a container.

The loaders may be extended to reach further into the trailer, in order to minimize the manual lifting and carrying of the packages, and retracted to a stored position to minimize the space taken up by the loader when not in use. However, because of the substantial size and weight of these loaders, extension and retraction is often accomplished by powered extension and retraction systems, which are typically complicated and expensive devices. The powered extension and retraction systems are often used to stop and hold the loader at the desired degree of extension. In other loaders, devices are arranged to apply additional friction to sliding or rolling elements of the loader in order to resist extension of the loader or to lock the loader in its current position.

Organizations that operate their own logistic systems, such as delivery services and major retailers, rely on the transportation and distribution of parcels and package goods in shipping containers and trailers. Other companies provide logistic-related services to their customers that involve the same activities. As comingled items with a plurality of ultimate destinations move through the logistic network, they are distributed, aggregated, and transported, through a process whereby individual items with common destinations are ultimately batched, transported, and delivered together. In this process, the items tend to be loaded and unloaded multiple times.

Different measures exist that characterize the efficiency of loading and unloading. For example, efficiency of labor may be optimal in a nested container model, in which the trailer represents the largest container, into which pallets or other large containers are loaded, which may contain multiple sub-nested levels of containerization, and finally the individual items themselves. The efficiency of space is typically optimized by eliminating the nested containers of multiple destinating items, and loading the items themselves directly into the trailers, a practice commonly referred to as "bed-loading."

The labor efficiency (productivity) of loading and unloading in the bed-loading environment has been improved through the use of extendible conveyors. The principle behind these devices is to provide a telescoping interface between material being unloaded or loaded and processing systems within the plant. The most sophisticated of these extendible conveyors are belt driven, powered, and are reversible to help with either loading or unloading. The devices can provide the operator with the means to adjust at least one, or as many as three, of the three potential axes of movement for the loading point.

FIG. 1 illustrates an extendible conveyor 100 in two views to show the axes of movement of the conveyor. In this example, the X-axis 110 represents "side-to-side" motion of the end of the extendible conveyor 100, for example within the trailer 102 or container being unloaded. The Y-axis 112 represents up-and-down motion to keep the end of the extendible conveyor at a height convenient for unloading. The Z axis 114 represents the motion of the end of the extendible conveyor 110 further or less further into the trailer 102 or container being unloaded. X-axis movement can be achieved, for example, by means of a pivoting section at the tip of the boom.

Extendible conveyor solutions as disclosed herein offer the possibility to change the position of the loading/unloading tip in as many as three axes.

These extendible conveyor products can include the feature of extending or retracting (Z-axis), raising or lowering (Y-axis), and traversing left and right (X-axis) to optimize the productivity of the operator responsible for loading and unloading. The controls for these positions are either entirely manual, or are controlled via operator interaction, such as a switch or joystick. Dedicated or prolonged interaction with these controls reduces operator productivity.

Such a telescoping structure cantilevered from an anchored base represents a common design for the extendible conveyors used for loading and unloading containers or trailers. Over the years of their use, the designs for these extendible conveyors have been growing in length to accommodate longer containers and trailers, and to improve the productivity of loading and unloading. Safety measures in these designs have not evolved with the longer products, which present unique safety concerns.

Chief among unaddressed safety concerns is the tenancy of the relatively undamped structure to oscillate at a very low resonant frequency that can be excited by the frequency of transient impulses coincident with either loading or unloading. That is, the extendible conveyor can begin to oscillate—to swing back-and-forth—along the X-axis or Y-axis, or to begin a cyclic movement in some combination of the X-axis and Y-axis. The amplitude of this oscillation can damage the items being loaded or unloaded or the machinery itself, or even worse, injure nearby personnel. Seismic events can also induce dangerous oscillation, but particularly along the Y-axis.

An improved means of controlling these axes of movement as disclosed herein can address this oscillation or "ringing" phenomenon.

Figure 2:
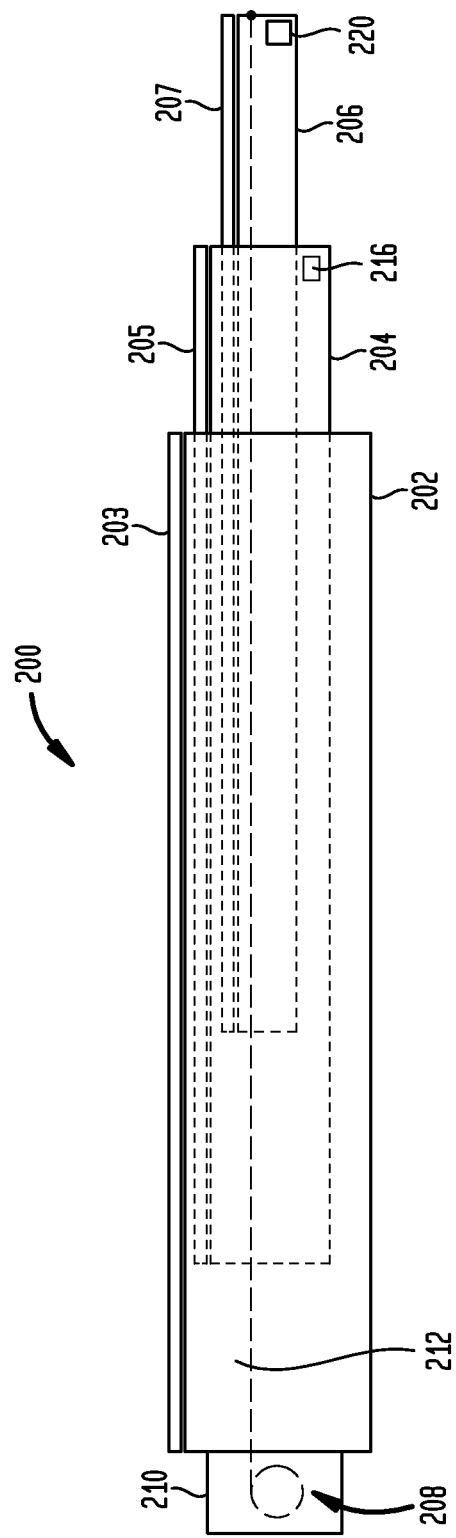
FIG. 2 depicts a schematic diagram of an extendable boom conveyor system in accordance with disclosed embodiments.

FIG. 2 depicts a schematic diagram of an extendable boom conveyor system 200. A rear boom element 202 encloses portions of a middle boom element 204 and a front boom element 206. As shown in FIG. 2, the boom apparatus 200 is in a substantially retracted configuration, with the middle boom element 204 and the front boom element 206 substantially retracted within the rear boom 202. Conveyor apparatuses 203, 205 and 207 are included on sides of the boom elements 202, 204 and 206, respectively, such that items may pass from one to another of the conveyor apparatuses 203, 205 and 207 along the extendable boom conveyor system 200 into or out of a container. In some embodiments, the conveyor apparatuses 203, 205 and 207 include one or more of wheels, rollers, or low friction surfaces, to allow items to move by gravity into or out of a container. In other embodiments, the conveyor apparatuses 203, 205 and 207 may include one or more powered strips or belts that carry items into or out of a container. In still other embodiments, a single conveyor apparatus may extend along the upper surfaces of some or all of the boom elements 202, 204 and 206, and extend and retract along with the boom elements 202, 204 and 206. Each boom element has a conveyor surface.

Extension and retraction of the boom apparatus 200 may be accomplished by a boom drive mechanism 208, comprising a winch 210 and cable 212 extending through the rear boom element 202 and the middle boom element 204. Front boom element 206 can have a separate drive mechanism 216, described in more detail below, that can include its own controllers, sensors, actuators, and other elements, and can communicate with drive mechanism 208 or other controllers. Drive mechanism 216 can be mounted on the front boom element 206 or on the middle boom element 204.

In some embodiments, front boom element 206 can comprise a lighter-weight material than the structure of the other boom elements, so that it can be more quickly extended and retracted. Similarly, drive mechanism 216 can operate so as to extend and retract front boom element 206 more quickly and responsively than drive mechanism 208 moves the rear boom element 202 and the middle boom element 204.

In various embodiments, drive mechanism 216 can automatically extend and retract front boom element 206 to maintain a safe but efficient distance from an operator that is loading parcels onto the conveyor apparatus (referred to in the singular for simplicity, but not limited to a single conveyor apparatus). Drive mechanism 208 can then extend or retract at a slower rate to allow the middle boom element 204 to "catch up" to the position of the front boom element 206. In this way, front boom element 206 can automatically maintain the distance from the operator in a relatively quick manner, and middle boom element 204 can then be adjusted more slowly into its new position relative to the user and the front boom element 206.

Drive mechanism 216 can include, among other elements, a motor, chain, belt, emergency-stop mechanism such as a button or otherwise, manual controls for moving the front boom element 206 or other portions of the extendible boom in any direction, contact bumper switches or other safety devices, or otherwise. In particular, drive mechanism 216 can include a proximity sensor, whether optical, sonar, or otherwise, that can detect the distance from front boom element 206 to an operator, the "stack" of parcels, or other objects, for automatic control of the movement and positioning of the boom elements. Drive mechanism 216 can communicate with other controllers or drive mechanisms to control the position and movement of the other boom elements with respect to the front boom element 206.

One safety mechanism can be implemented as a sensing edge at the tip of the boom apparatus 200, as at the end of front boom element 206, which, when depressed, causes the boom apparatus 200 to be retracted a certain distance. The structural oscillation of boom apparatus 200 can be reduced, for example, by increasing the stiffness of the boom apparatus 200 or using damping techniques, but these approaches are often impractical for cantilevered telescoping conveyors such as that illustrated in FIG. 2.

Disclosed embodiments include a safety device for extendible conveyors that incorporates a movement sensor for the movement at the tip of the conveyor that preferably detects movement in all three axes of motion, such as illustrated as movement sensor 220 in FIG. 2. One example of a suitable movement sensor is a multi-axis accelerometer. Such an accelerometer can measure its own acceleration in up to three axes, a function that allows movement corresponding to the acceleration to be predicted. Movement sensor 220 can be mounted, for example, within or on the underside of front boom element 206, preferably near the distal end. In some embodiments, movement sensor 220 can be integrated with an edge contact sensor at the distal end of front boom element 206. The "distal end" refers to the end of the extendible conveyor that is furthest from the base, and therefore most likely to experience the oscillations described herein.

Movement sensor 220, such as an accelerometer combined with control circuitry, may be used to measure the motion of the tip of the conveyor to detect unsafe conditions coincident with physical interaction with the conveyor, for example as part of the input device, as an independent sensor, or otherwise. For example, since the conveyors are typically cantilevered structures that extend dozens of feet from their mounting structure, the overall structure tends to resonate with very low frequency excitation. These low frequencies can be produced through the kinetic interaction with the structure, such that applying articles of significant weight can occur at near synchronization to the natural frequency of the structure, or a harmonic thereof. When this occurs, structural ringing is realized as an oscillation of the conveyor tip, whose amplitude may grow as energy is stored with continued synchronized interaction. This oscillation may damage the equipment or, even worse, harm personnel working nearby. The movement sensor 220 can be used to detect oscillation of the conveyor tip, to retract the conveyor tip to interrupt synchronized interaction, and in some embodiments, to sound an alarm.

Figure 3:
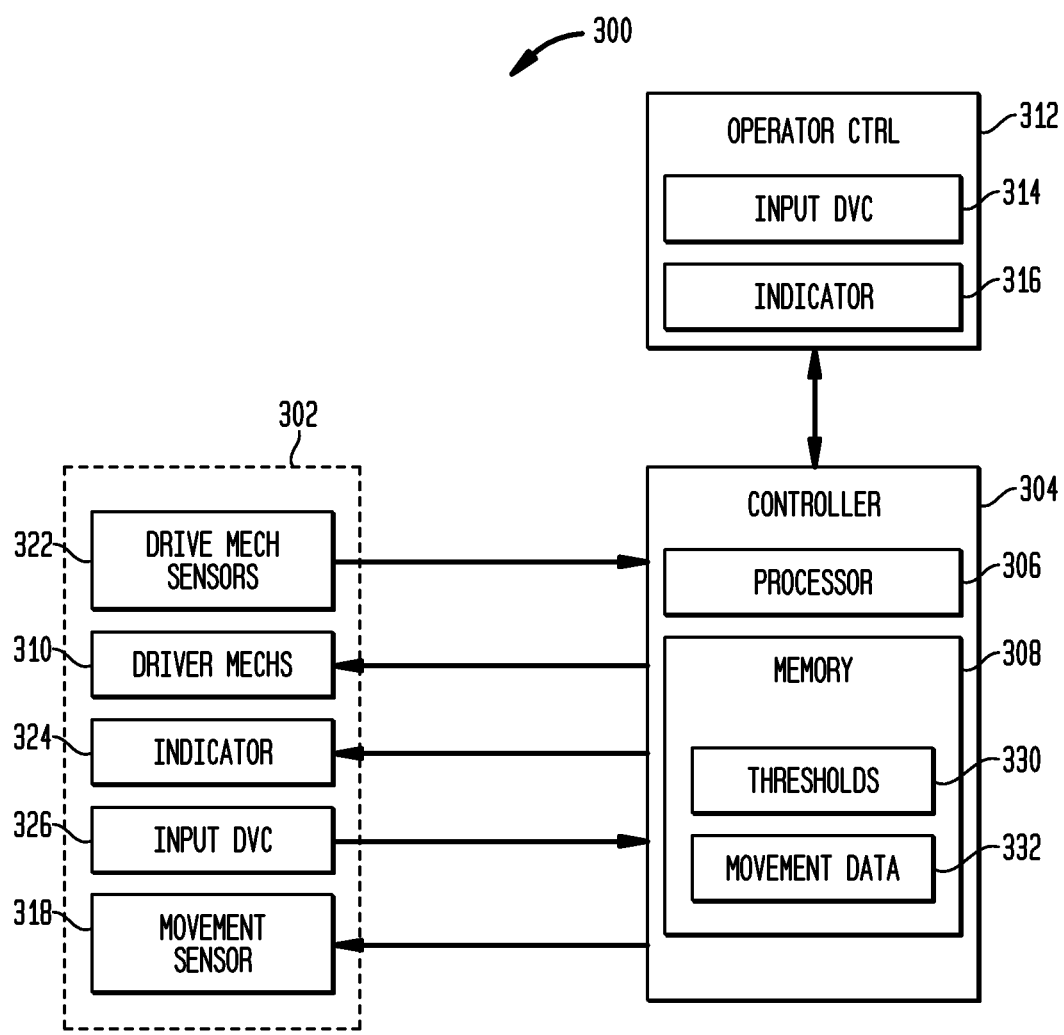
FIG. 3 depicts a block diagram of an extendible conveyor system 300 in accordance with disclosed embodiments.

FIG. 3 depicts a block diagram of an extendible conveyor system 300 in accordance with disclosed embodiments. The boom extendible conveyor system 300 includes an operator control 312, a controller 302, and an extendable boom 302.

The operator control 312 includes an input device 314 and an indicator 316. A boom operator can use the input device 314 to signal the controller 304 to extend or retract the extendable boom 302. The input device 314 may be a joystick, rocker switch, touch-sensitive screen or other suitable user interface device. The controller 304 uses the indicator 316 to signal the operator a current configuration of a follower mechanism 318 on the extendable boom 302 and/or a current condition of a drive mechanisms 310 on the extendable boom 302 (either on the main boom or on the extension/front end boom). The indicator 316 may be one or more lamps or LEDs, a character display, a graphical display, or other suitable user interface device. The extendable boom 302 also includes an input device 326 and an indicator 324, with similar functionality to the input device 314 and indicator 316. In other embodiments, either the input device 314 or the input device 326 may additionally or alternatively include a button or other suitable switch to use as a 'kill switch' to cause the controller 304 to immediately signal the drive mechanisms 310 to stop motion of the extendable boom 302.

The controller 304 includes data processing hardware such as a processor 306 and storage 308 that can include volatile memory, non-volatile memory, optical storage, magnetic storage, or other computer-readable storage media as known to those in the art. The controller 304 can be implemented using one or more physical systems, and may include multiple processors 306 or storage 308; the examples herein refer to these in the singular, but are not intended to limit the physical implementations. As described above, a separate controller can also be placed at or near the front end boom to control its separate extension/retraction and to control the subsequent extension/retraction of the other boom elements.

The extendable boom 302 includes the input device 326, the indicator 324, the drive mechanism 310, configured to extend and retract the extendable boom 302, and one or more drive mechanism sensors 322, configured to sense one or more conditions of the drive mechanism 310. The mechanism sensors 322 can include proximity sensors, a Kinect® type input device, emergency or bumper switches, encoders, or others.

The movement sensor 318 is configured to detect oscillations or cyclic movement of the distal end of extendable boom 302. In particular, controller 304 can detect oscillations or cyclic movement of the distal end of extendable boom 302 using movement sensor 318, and in response can automatically extend or retract the front end boom to dampen, reduce, or stop the oscillations or cyclic movement, such as by retracting the front end boom into the middle boom element. Similarly, controller 304 can detect when the oscillations or cyclic movement of the distal end of extendable boom 302 have stopped, also using movement sensor 318. In some embodiments, movement sensor 318 can be physically or electrically integrated with mechanism sensors 322.

A movement sensing function as described herein, when implemented in an extendible conveyor, allows dangerous conditions to be monitored relative to the movement in the structure of the extendible conveyor. Oscillation of the boom as well as vibration can be measured using the movement sensor. Some amplitudes of vibration and oscillation, measured at the distal end of the extendible conveyor, are considered normal during use. The controller can store thresholds 330 in memory 308, which include thresholds for amplitude for each of the two critical axes of motion: X-axis (left and right motion) and Y-axis (up and down motion), and can store other movement data 332 as described herein.

X-axis motion is regarded as unusual in an extendable boom conveyor because there are not excitation means in normal operation on this axis. Several potential sources could excite the structure in this axis, including personnel interaction that is innocent motion coincidental to normal operation, such as the mold force applied by a user leaning against the side of the conveyor, or intentional activity with the intent of damaging the equipment, such as deliberately pushing or swinging the boom side-to-side. Machine malfunction could also cause mild acceleration in the X-axis, such as might be seen in equipment with improperly adjusted or severely worn mechanisms. Seismic activity, depending on the alignment of the equipment to the sudden movement of the Earth's crust, can also induce significant X-axis motion to the distal end of a conveyor, especially when the conveyor is extended.

Severe X-axis motion, such as transverse whipping several feet back and forth, is very dangerous; the structure of the mounting system can fail, extensive equipment damage can occur, and nearby personnel can be injured. A safety device including a movement sensor as described herein can measure this X-axis motion and partially or fully retract the extendible conveyor depending on the amplitude of the acceleration, its frequency, and duration. A visible or audible alarm can also be activated depending on the amplitude of the acceleration.

Modest Y-axis motion, such as the distal end "bouncing" up and down a few inches, is relatively common to normal operation by way of human interaction, because transient loads are repeatedly applied or removed to and from the tip of the extendible conveyor at such a rate and in such a way as to excite mild oscillation. Personnel interaction can also excite Y-axis oscillation intentionally, which, when carried to extremes, can also cause damage to equipment and harm nearby personnel. A safety device including a movement sensor as described herein can partially or fully retract the extendible conveyor depending on the amplitude of the acceleration, its frequency, and duration. A visible or audible alarm can also be set depending on the amplitude of the acceleration.

Combining a movement sensor 318 with mechanism sensors 322, such as an end contact sensor, offers a straightforward, modular packaging for an integrated extendible boom safety system, because the existing safety function and the movement-detection and response processes described herein both react to the various safety conditions by retracting the conveyor. In other words, the processes and devices described herein provide additional reasons for retracting the conveyor, based on accelerometer readings rather than contact on an edge sensing surface.

Figure 4:
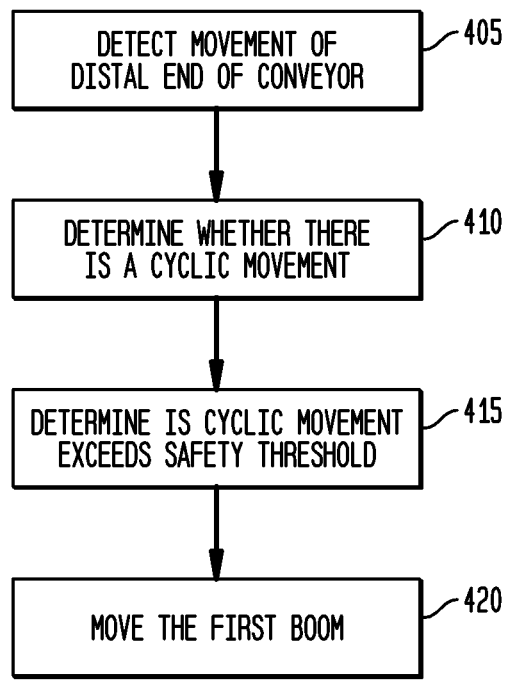
FIG. 4 illustrates a flowchart of a process in accordance with disclosed embodiments using an extendible conveyor as disclosed herein.

FIG. 4 illustrates a flowchart of a process in accordance with disclosed embodiments using an extendible conveyor as disclosed herein.

In an embodiment of this process, the extendible conveyor is assumed to be placed such that its first boom element is proximate to or inside a trailer or other container so that parcels can be unloaded from the conveyor and onto the first boom element by a user.

The extendible conveyor detects movement of a distal end of a first boom element of the extendible conveyor (405). This can be accomplished by a movement sensor 318, which can include a multi-axis accelerometer. Detecting movement can include determining an amplitude of movement in one or more axes. The movement detection can be continuous, where the movement sensor constantly or repeatedly provides movement data to a controller, such as movement direction, amplitude, or force.

The extendible conveyor determines whether there is an oscillating or cyclic movement (both possibilities referred to generally as "cyclic movement") of the distal end in one or more axes (410). This can include storing the movement data in memory 308 and comparing successive movement data to detect the cyclic movement based on the movement data.

The extendible conveyor determines if the cyclic movement exceeds any safety thresholds (415). This can include comparing the movement data to one or more thresholds representing one or more axes.

When the cyclic movement exceeds a safety threshold, the extendible conveyor moves the first boom (420). This can include adjusting any of the X, Y, and Z axes, and in most cases will comprise retracting the first boom. As part of this step, the extendible conveyor can continue to repeat steps 405-415 until it determines that there is no cyclic movement or that any cyclic movement no longer exceeds any safety thresholds. As part of this step, the extendible conveyor can also activate an audible or visual alarm.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. An extendable boom conveyor system comprising:
   a first boom element;
   a controller;
   a movement sensor, wherein the controller, using the movement sensor, detects cyclic movement of a distal end of the first boom element and, in response to the detection, moves the first boom element to reduce the cyclic movement.

2. The extendable boom conveyor system of claim 1, wherein the movement sensor includes a multi-axis accelerometer.

3. The extendable boom conveyor system of claim 1, wherein the controller determines if the cyclic movement exceeds any safety thresholds.

4. The extendable boom conveyor system of claim 1, wherein the controller also, in response to the detection, activates an audible alarm.

5. The extendable boom conveyor system of claim 1, wherein moving the first boom element to reduce the cyclic movement includes retracting the first boom element into a second boom element.

6. The extendable boom conveyor system of claim 1, wherein the controller, using the movement sensor, detects when the cyclic movement has stopped.

7. The extendable boom conveyor system of claim 1, wherein the movement sensor is integrated with an end contact sensor.

8. The extendable boom conveyor system of claim 1, wherein the cyclic movement is one of an oscillation in the X-axis or an oscillation in the Y-axis.

9. The extendable boom conveyor system of claim 1, wherein the cyclic movement is a combination of an oscillation in the X-axis and an oscillation in the Y-axis.

10. The extendable boom conveyor system of claim 1, wherein the controller retracts the first boom element to reduce the cyclic movement until the cyclic movement does not exceed any safety thresholds.

11. A method performed by an extendible conveyor system having a first boom element, a second boom element, a movement sensor, and conveying surfaces on the first boom element and the second boom element, comprising:
   detecting movement of a distal end of the first boom element;
   determining whether there is a cyclic movement of the distal end in one or more axes;
   moving the first boom element when there is a cyclic movement of the distal end.

12. The method of claim 11, wherein the movement sensor includes a multi-axis accelerometer.

13. The method of claim 11, further comprising determining if the cyclic movement exceeds any safety thresholds.

14. The method of claim 11, further comprising activating an alarm in response to the determination.

15. The method of claim 11, wherein moving the first boom element to reduce the cyclic movement includes retracting the first boom element into the second boom element.

16. The method of claim 11, further comprising using the movement sensor to detect when the cyclic movement has stopped.

17. The method of claim 11, wherein the movement sensor is integrated with an end contact sensor.

18. The method of claim 11, wherein the cyclic movement is one of an oscillation in the X-axis or an oscillation in the Y-axis.

19. The method of claim 11, wherein the cyclic movement is a combination of an oscillation in the X-axis and an oscillation in the Y-axis.

20. The method of claim 11, further comprising retracting the first boom element to reduce the cyclic movement until the cyclic movement does not exceed any safety thresholds.

* * * * *